United States Patent
Schorr et al.

(10) Patent No.: US 10,012,531 B2
(45) Date of Patent: Jul. 3, 2018

(54) LASER SOURCE DIRECTION FINDING UNDER NON-UNIFORM ILLUMINATION CONDITIONS

(71) Applicant: BAE SYSTEMS Information and Electronic Systems Integration Inc., Nashua, NH (US)

(72) Inventors: David J. Schorr, Austin, TX (US); Will R. Grigsby, Austin, TX (US); Somit S. Mathur, Austin, TX (US); Bill Alexander, Spicewood, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 9 days.

(21) Appl. No.: 15/298,820

(22) Filed: Oct. 20, 2016

(65) Prior Publication Data
US 2018/0113021 A1    Apr. 26, 2018

(51) Int. Cl.
| | |
|---|---|
| *G01J 1/44* | (2006.01) |
| *G08B 21/18* | (2006.01) |
| *G01J 1/02* | (2006.01) |
| *G01J 1/42* | (2006.01) |

(52) U.S. Cl.
CPC ............ *G01J 1/0266* (2013.01); *G01J 1/0295* (2013.01); *G01J 1/4228* (2013.01); *G01J 1/4257* (2013.01); *G01J 1/44* (2013.01); *G08B 21/182* (2013.01); *G01J 2001/446* (2013.01)

(58) Field of Classification Search
CPC ........ H04R 3/005; H04R 23/08; H04R 1/326; H04R 3/04; H04R 2430/20; G01L 21/0208; G01L 25/93; G01J 1/44; G01J 3/50; G01J 1/0266; G01J 1/0295; G01J 1/4228; G01B 11/14
See application file for complete search history.

(56) References Cited

U.S. PATENT DOCUMENTS

| | | | | |
|---|---|---|---|---|
| 4,355,896 A | * | 10/1982 | Frosch | G01W 1/00 250/203.4 |
| 4,550,250 A | * | 10/1985 | Mueller | G06F 3/042 178/18.09 |
| 4,711,998 A | * | 12/1987 | Malek | G01S 3/7861 250/206.1 |

(Continued)

*Primary Examiner* — Sang Nguyen
(74) *Attorney, Agent, or Firm* — Finch & Maloney PLLC; Scott J. Asmus (57) ABSTRACT

Techniques are provided for estimating the direction of a laser source under non-uniform illumination conditions such as laser speckle. An example system may include a detector array comprising sensors configured to detect the amplitude of the received laser signal. The sensors are disposed on the array at unique orientation angles relative to each other. The sensor size is selected based on the speckle pattern of the laser signal such that the sensors are small enough to be uniformly illuminated by the laser signal in the presence of speckle. The system also includes an amplitude ratio calculation circuit configured to calculate ratios of the amplitudes between each of two sensors of one or more pairs of sensors. The system further includes an angle of arrival calculation circuit configured to estimate the direction of the source of the laser signal based on the calculated ratios and the orientation angles of the sensors.

18 Claims, 9 Drawing Sheets

(56) References Cited

U.S. PATENT DOCUMENTS

| | | | | |
|---|---|---|---|---|
| 4,769,531 A * | 9/1988 | Malek | ............... | G01S 3/783 126/574 |
| 4,792,231 A * | 12/1988 | Fried | ............... | G01S 17/06 356/521 |
| 5,103,088 A * | 4/1992 | Halldorsson | ............ | G01S 3/781 250/227.12 |
| 5,166,668 A * | 11/1992 | Aoyagi | ............ | G06F 3/03542 345/180 |
| 5,499,098 A * | 3/1996 | Ogawa | ............... | G01D 5/34 250/222.1 |
| 6,597,443 B2 * | 7/2003 | Boman | ............ | G01B 11/22 345/158 |
| 6,995,836 B1 * | 2/2006 | Tondorf | ............ | G01D 5/26 356/138 |
| 7,508,512 B1 * | 3/2009 | Rollins | ............ | G01B 11/272 349/139 |
| 7,575,190 B2 * | 8/2009 | Sallee | ............ | F41G 7/2246 244/3.1 |
| 8,164,038 B2 * | 4/2012 | Chen | ............... | G01S 3/7861 250/203.4 |
| 2003/0234349 A1 * | 12/2003 | Wootton | ............ | G01S 3/783 250/226 |
| 2012/0086944 A1 * | 4/2012 | Chrien | ............... | B64G 1/66 356/450 |
| 2014/0192367 A1 * | 7/2014 | Jungwirth | ............ | G01S 7/495 356/614 |

\* cited by examiner

LASER SOURCE DIRECTION FINDING UNDER NON-UNIFORM ILLUMINATION CONDITIONS

FIELD OF DISCLOSURE

The present disclosure relates to direction finding of a laser source, and more particularly, to laser source direction finding under conditions of non-uniform illumination or laser speckle.

BACKGROUND

Laser warning systems are generally required to alarm when subjected to laser illumination and to estimate the direction from which the laser illumination is received, for example to locate the source of the transmission. Existing systems use relatively large sensors to achieve the necessary sensitivity to detect the laser in situations involving beam scatter and other forms of indirect illumination, under which the received laser signal power is reduced. In the case of direct laser illumination, however, laser speckle can cause these systems to generate unacceptably large errors in the estimated direction due to the resulting non-uniform illumination.

SUMMARY

One example embodiment of the present disclosure provides a system for estimating the direction of a laser source. The system includes a detector array comprising multiple sensors configured to detect the amplitude of the received laser signal. The sensors are disposed on the array at unique orientation angles relative to each other. The sensor size is selected based on the speckle pattern of the laser signal such that the sensors are small enough to be uniformly illuminated by the laser signal in the presence of speckle, as will be explained in greater detail below. The system also includes an amplitude ratio calculation circuit configured to calculate ratios of the detected amplitudes between each of two sensors of one or more pairs of the sensors. The system further includes an angle of arrival calculation circuit configured to estimate the direction of the source of the laser signal based on the calculated ratios and on the orientation angles of the sensors.

Another example embodiment of the present disclosure provides a sensor array for estimating the direction of a laser source. The sensor array includes a two or more sensors and is configured to detect the amplitude of a received laser signal. Each sensor is disposed on the array at a unique orientation angle relative to the other sensors. The size of the sensors is selected based on a speckle pattern of the laser signal, such that the sensors are uniformly illuminated by the laser signal.

Yet another example embodiment of the present disclosure provides computer readable storage medium having instructions encoded thereon that, when executed by one or more processors, result in operations for estimating the direction of a laser source. The operations include detecting the amplitude of a received laser signal at each of a plurality of sensors disposed on a detector array. The sensors are sized based on a speckle pattern of the laser signal such that the sensors are uniformly illuminated by the laser signal. The operations also include calculating ratios of the detected amplitudes between each of two sensors of one or more pairs of the sensors. The operations further include estimating a direction of the source of the laser signal based on the calculated ratios and on the orientation angles of the sensors as disposed on the detector array.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides techniques for estimating the direction of a laser source under non-uniform illumination conditions. These non-uniform illumination conditions can result, for example, from speckle or scintillation effects that arise when the laser detector's array of sensors is subject to direct illumination from the laser. The resulting non-uniform illumination can have the effect of introducing relatively large errors in the detected amplitudes at each sensor which adversely impact the direction estimation calculations. The disclosed techniques address this problem by reducing the size (e.g., surface area exposed to the illumination) of the sensors such that an array of smaller sensors lays within an area of relatively uniform illumination within the varying speckle pattern. In some embodiments, the system may be configured with two detector arrays, one comprising larger sensors to provide greater sensitivity for lower power signals, and a second array comprising smaller sensors to reduce the effects of non-uniform illumination. Numerous configurations and form factors will be appreciated.

In accordance with an embodiment, the disclosed techniques can be implemented, for example, in a computing system and associated sensor arrays, or a software product executable or otherwise controllable by such systems. The system or product includes a detector array comprising multiple sensors configured to detect the amplitude of the received laser signal. The sensors are disposed on the array at unique orientation angles relative to each other to facilitate angle of arrival calculations. The sensor size is selected based on the speckle pattern of the laser signal such that the sensors are small enough to be uniformly illuminated by the laser signal in the presence of speckle. The system is also configured to calculate ratios of the detected amplitudes between each of two sensors of one or more pairs of the sensors. The system is further configured to estimate the direction of the source of the laser signal based on the calculated ratios and on the orientation angles of the sensors. In some embodiments, the system is still further configured to apply a calibration correction to each array to correct for sensitivity differences between the sensors of that array.

As will be appreciated in light of this disclosure, the techniques provided herein may provide improved direction estimation under varying conditions, compared to existing systems that employ larger sensors which are susceptible to laser speckle effects. Additionally, at least some portions of these techniques can be implemented in hardware or software or a combination thereof.

Figure 1:
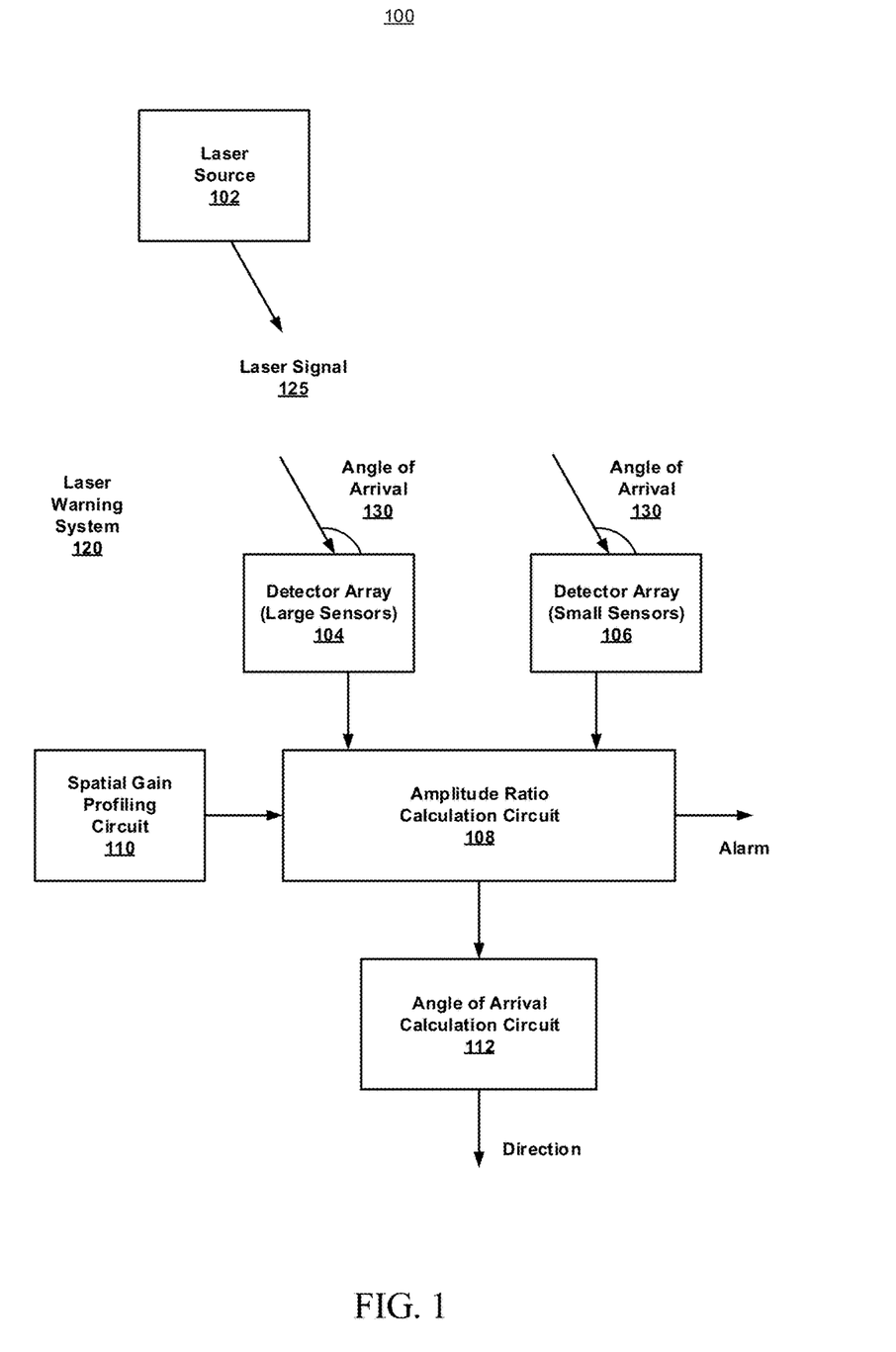
FIG. 1 is a block diagram of a laser warning system, configured in accordance with certain of the embodiments disclosed herein.

FIG. 1 is a block diagram 100 of an implementation of laser warning system 120, configured in accordance with certain of the embodiments disclosed herein. The laser warning system is shown to include a detector array 106 comprising small sensors, an amplitude ratio calculation circuit 108, a spatial gain profiling circuit 110, and an angle of arrival calculation circuit 112. In some embodiments, an additional detector array 104, comprising large sensors is also employed to provide increased sensitivity to detect weaker signals. At a high level, the laser warning system is configured to detect and alarm on laser illumination 125, and to estimate the direction of the illuminating source 102. In some embodiments, the detector arrays 104, 106 may be mounted on two or more sides of a potential target, such as a tank, truck, or other vehicle, to provide signal inputs to the laser warning system 120 which may also be deployed on the vehicle. The laser warning system may thus enable defensive capabilities for the vehicle, for example against an incoming laser guided missile.

The detector array 106 comprises a number of sensors which are configured to detect the amplitude of a received laser signal. Each of the sensors is disposed on the array at a unique orientation angle relative to the other sensors in the array, as illustrated, for example, as 204 in FIG. 2. The sensors of array 106 are referred to, herein, as "small" or "smaller" sensors to describe their relative size with respect to the "larger" sensors of detector array 104. The size of the smaller sensors is based on the speckle pattern of the laser signal, as illustrated for example in FIG. 6A, such that the sensors are uniformly illuminated by the laser signal, even under speckle conditions, as illustrated in FIG. 6B. The speckle size at the target may vary depending on a number of factors including, for example, characteristics of the laser source, atmospheric conditions, and range from source to target. In some embodiments, assumptions are made with respect to these factors to derive a desired sensor size and spacing.

In some embodiments, the small sensor size is in a range of approximately less than or equal to 0.05 inches. This size refers to, for example, the diameter (for small circular sensors) or width (for small square sensors). In a more general sense, the size of a sensor generally refers to a largest dimension of active sensor area of an individual small sensor. As will be appreciated, the shape of the active sensor area can vary depending on factors such as the sensor fill ratio.

The additional detector array 104 comprises a number of larger sensors which are also configured to detect the amplitude of the received laser signal. Each of these larger sensors is also disposed on the array at a unique orientation angle relative to the other sensors in that array 104. The size of the larger sensors is based on sensitivity requirements for detecting the laser signal subjected to scattering effects, such as diffuse port scattering or aerosol scattering, which can diminish the laser illumination. In some embodiments, the larger sensor size is in a range of approximately greater than or equal to 0.5 inches (e.g., sensor diameter or width, or other largest dimension of active sensor area of a given sensor, as previously explained). In some embodiments, the large and small sensors are PIN diodes. In some embodiments, each of the small and large detector arrays includes five or more sensors. In one specific embodiment, the small sensor array has five sensors and the larger sensor array has five or more sensors.

In some further embodiments, any number of additional arrays may be deployed, each comprising sensors of additional sizes, for example, sizes between "small" and "large," to accommodate a wider range of anticipated speckle conditions. Threshold decision values could be established for use in conjunction with measured illumination variations (e.g., uniform versus non-uniform) over any given detector array sensor size, to determine confidence in the angle of arrival estimation.

Figure 2:
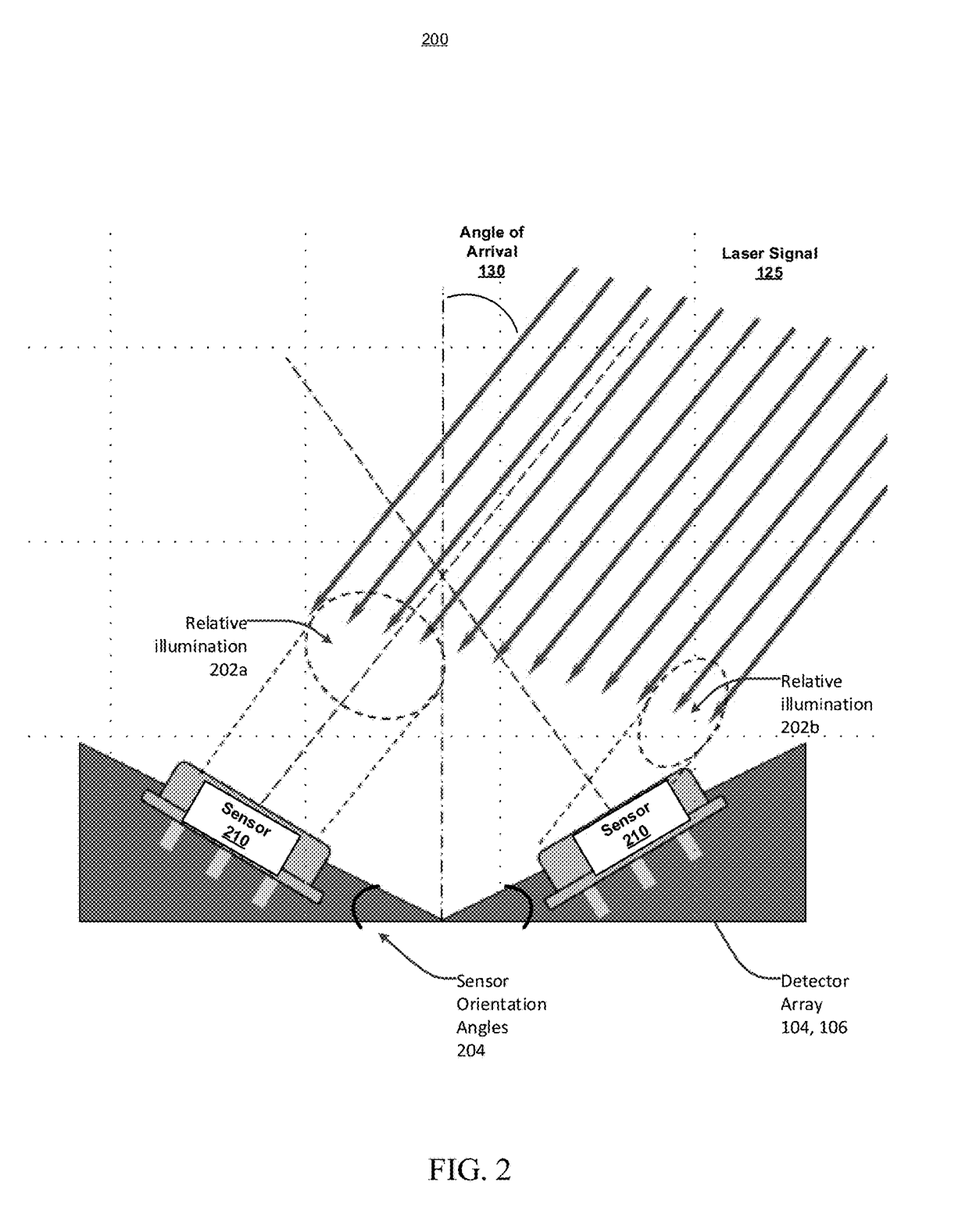
FIG. 2 illustrates angle of arrival effects related to sensor orientation, in accordance with certain of the embodiments disclosed herein.
Figure 3:
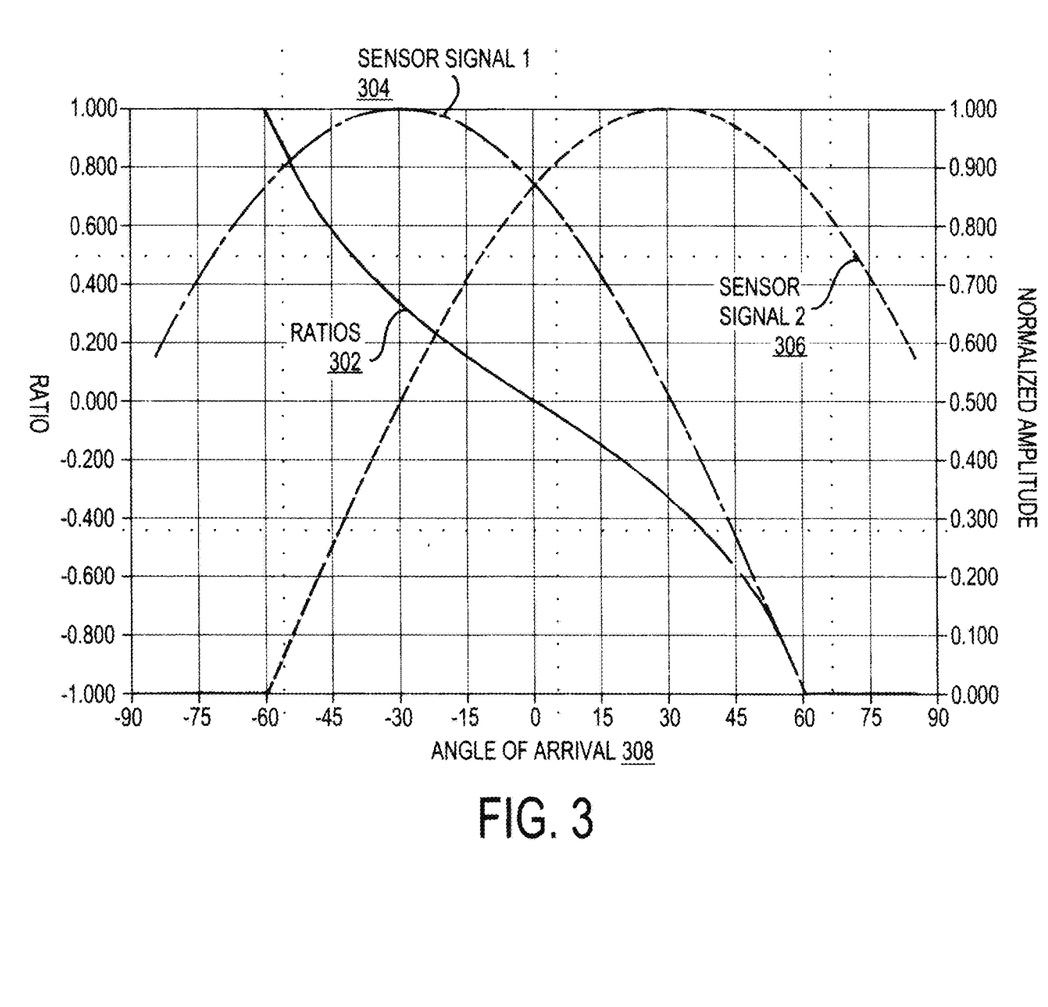
FIG. 3 is a plot illustrating angle of arrival ratios, in accordance with certain of the embodiments disclosed herein.

The amplitude ratio calculation circuit 108 is configured to calculate ratios of the detected amplitudes between each of two sensors of one or more pairs of the sensors of an array. For example, if there are five sensors in the detector array, numbered 1-5, ratios may be calculated for sensor pair 1 and 2, sensor pair 1 and 3, sensor pair 3 and 5, etc. Ratios can be calculated for any or all combinations of pairs of sensors. As illustrated in FIG. 2, the laser signal 125, illuminating the detector at an angle of arrival 130, will result in differing levels of relative illumination (202a versus 202b) at each sensor due to the different sensor orientation angles 204. As shown in FIG. 3, the amplitude ratios 302 (for example, between a first sensor signal 304 and a second sensor signal 306) can be mapped to an angle of arrival (AOA) 308, based on trigonometric calculations, using know techniques in light of the present disclosure. The angle of arrival calculation circuit 112 is configured to estimate the direction of the source of the laser signal based on some combination or weighted combination of these calculated ratios, given the known orientation angles of the sensors. In some embodiments, the ratio may be calculated as (sensor signal 1−sensor signal 2)/(sensor signal 1+sensor signal 2).

In some embodiments, the spatial gain profiling circuit 110 is configured to apply a spatial gain profile to the detected amplitudes to correct for calibrated sensitivity differences between the sensors, prior to calculating the amplitude ratios.

In some embodiments, the amplitude ratio calculation circuit 108, or other suitable circuitry, is further configured to generate an alarm signal in response to a detection of the laser signal exceeding a threshold amplitude value.

The use of both large and small detector arrays 104, 106 provides an increase in the instantaneous dynamic range that can be handled by the system, since the smaller detector is used within the higher energy (speckled) beam at lower sensitivity, while the large detector affords greater sensitivity, due to the larger sensor size, for lower energy scattered beams. The fact that speckle structure is only present within a direct beam (where laser energy levels are high), and not present in regions where diffuse port scattering and aerosol scattering produce much lower energy levels, can thus be exploited for increased dynamic range and improved angle of arrival estimation.

Figure 4:
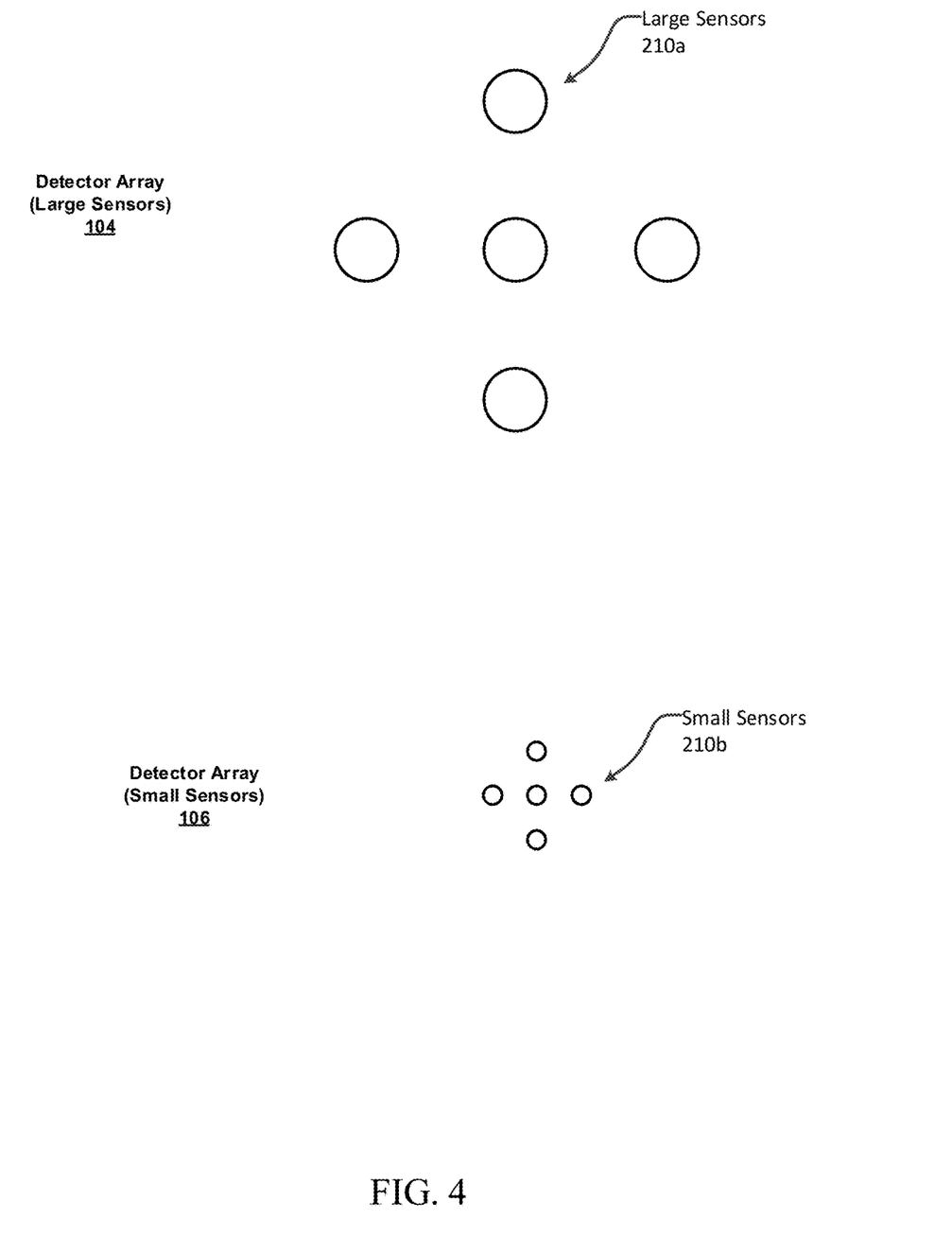
FIG. 4 illustrates detector array sensor patterns and sizes, configured in accordance with certain of the embodiments disclosed herein.
Figure 5:
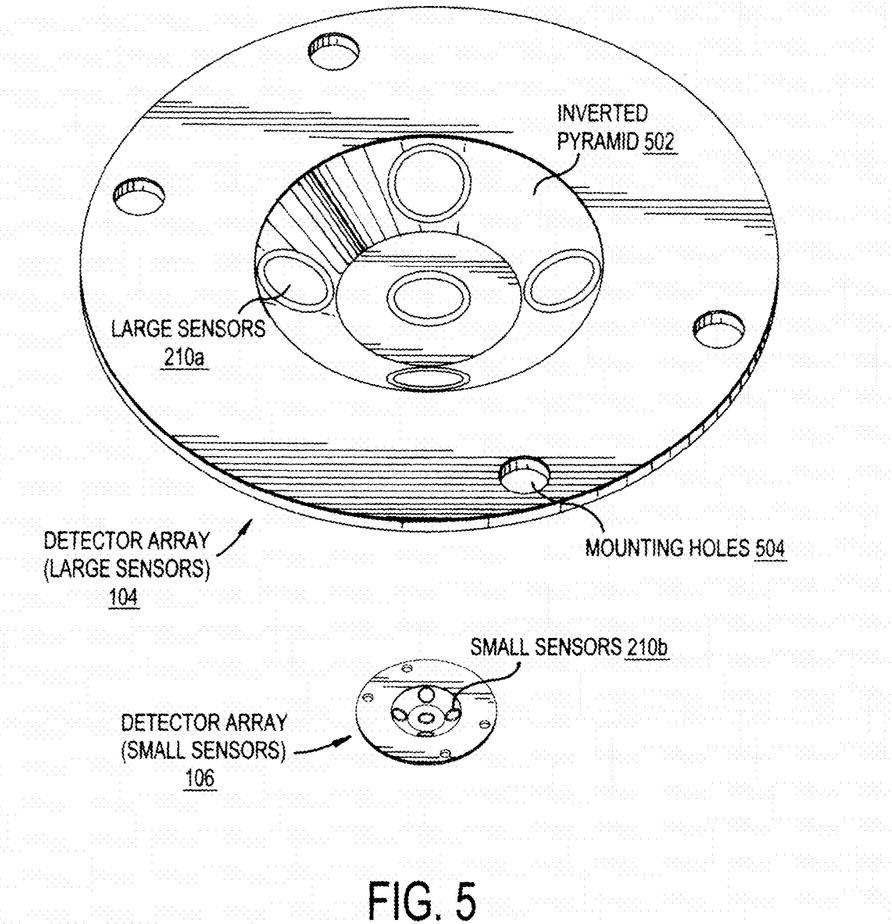
FIG. 5 illustrates detector arrays, configured in accordance with certain of the embodiments disclosed herein.

FIG. 4 schematically illustrates example detector array sensor patterns 104, 106 and relative sizes, configured in accordance with certain of the embodiments disclosed herein. In this example, five sensors 210a and 210b are shown for each detector, although that number may vary in different embodiments. The size difference is not shown to scale, but rather is intended to illustrate that there may be a relatively significant difference, for example on the order of a factor of ten or more. FIG. 5 depicts an example 3 dimensional representation of the detector arrays 104, 106, configured in accordance with certain of the embodiments disclosed herein. Here again the relative size difference is illustrated along with an inverted pyramid or cone shaped contour 502 which is configured to provide the varying sensor orientation angles for large sensors 210a and small sensors 210b. Mounting holes 504 are also shown.

Figure 6A:
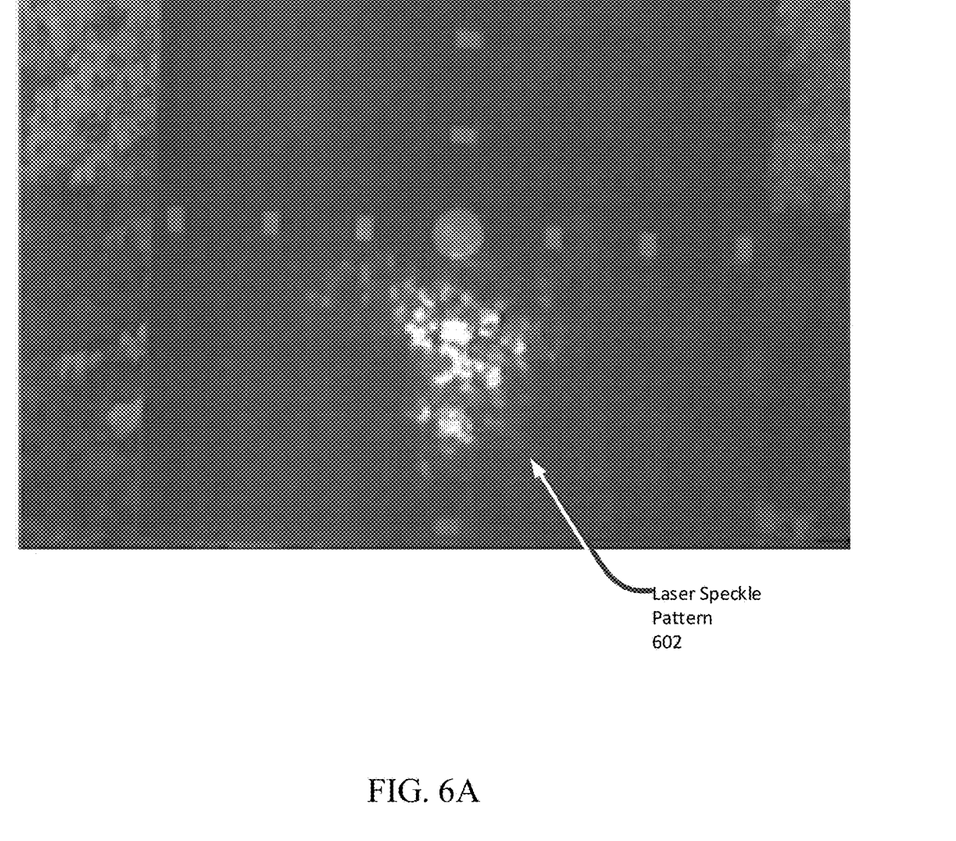
FIG. 6A illustrates a laser speckle pattern, in accordance with certain of the embodiments disclosed herein.
Figure 6B:
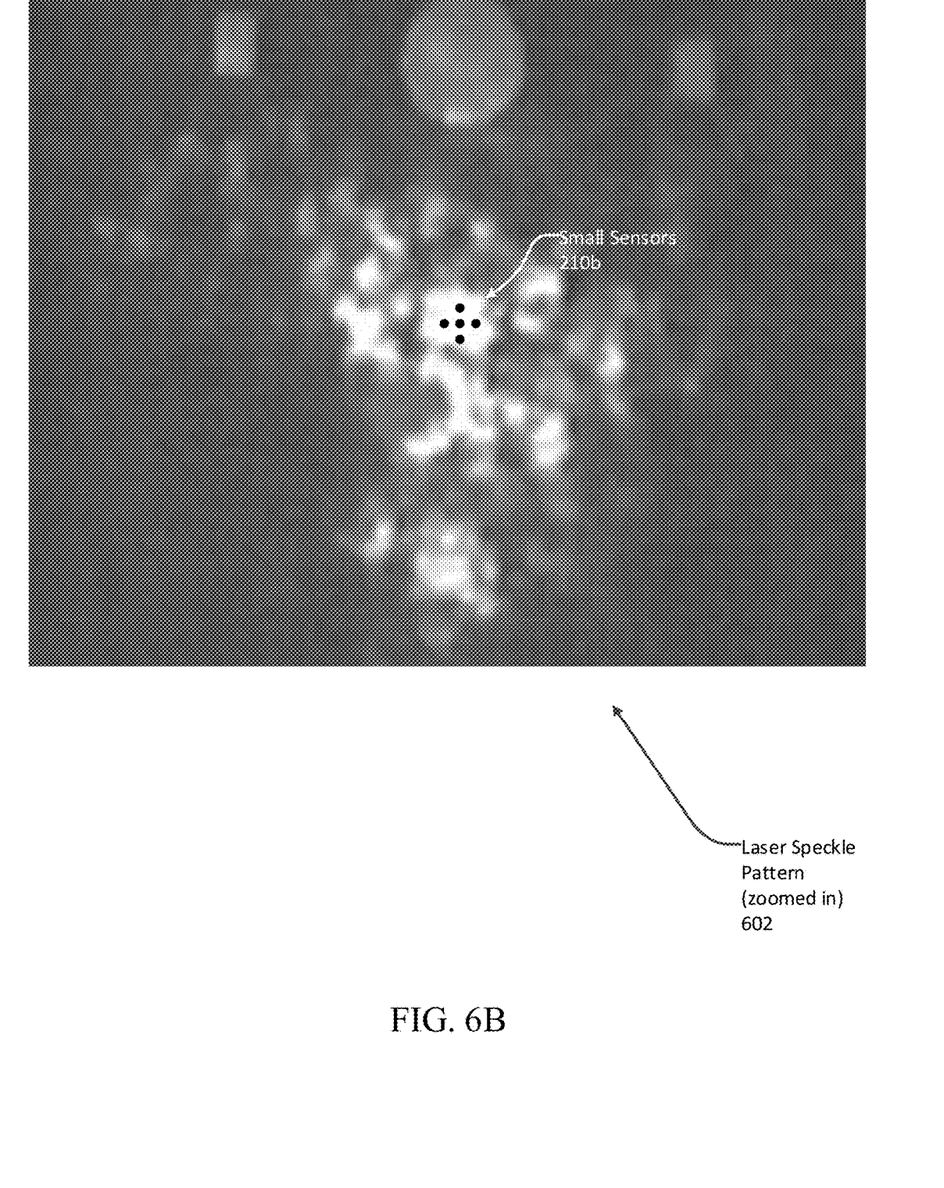
FIG. 6B illustrates a small sensor array overlaid on a laser speckle pattern, in accordance with certain of the embodiments disclosed herein.

FIG. 6A illustrates an example laser speckle pattern 602, in accordance with certain of the embodiments disclosed herein. As can be seen, there is significant structure within the laser beam that results in non-uniform illumination. The tic marks are spaced at one foot intervals and the central circle is six inches in diameter. Thus, the size of the structures within the speckle pattern is on the order of the size of the large detector array. FIG. 6B illustrates a close up or zoomed in view of the same speckle pattern 602, with an example array of small sensors 210b overlaid on the speckle pattern. As can be seen, the small sensor detector array size may be chosen for uniform illumination by a sub-region within the speckle pattern.

Methodology

Figure 7:
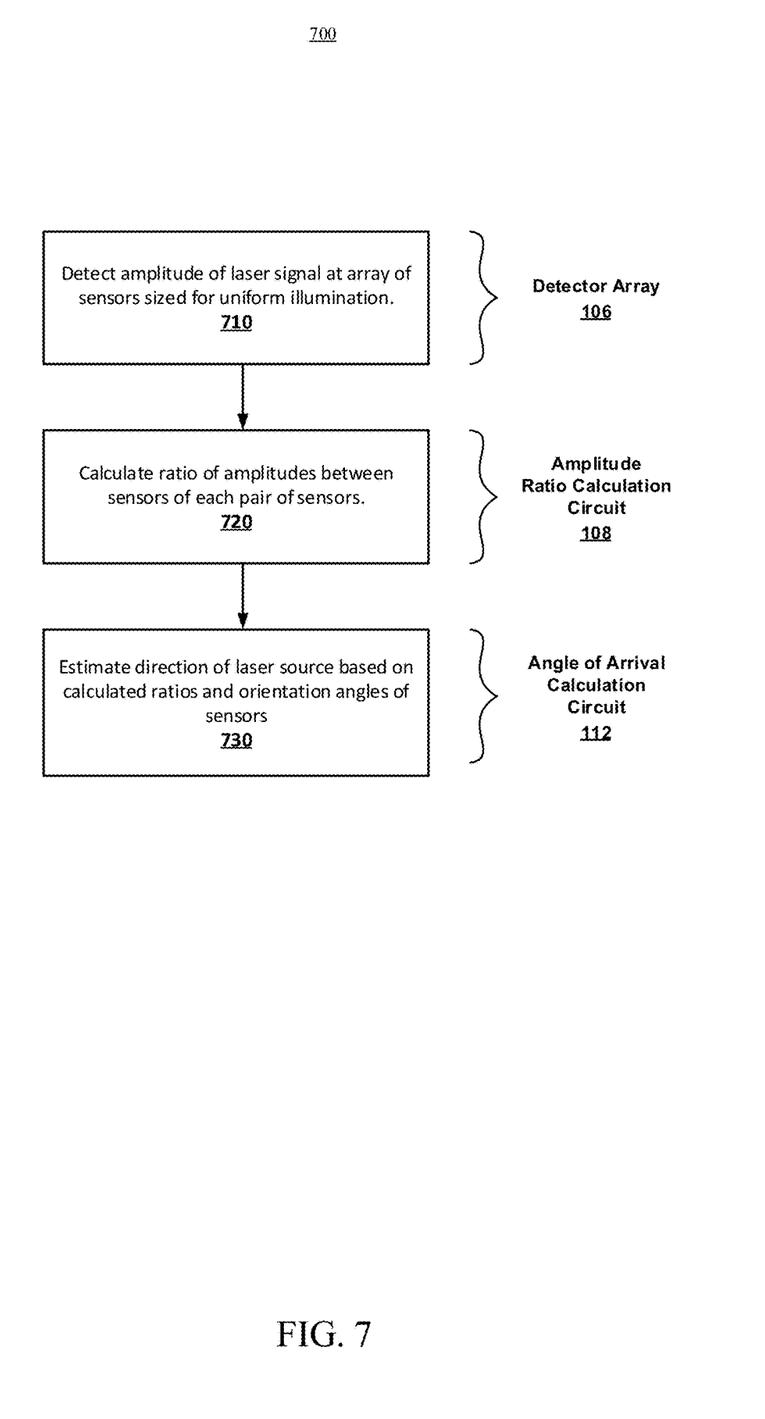
FIG. 7 is a flowchart illustrating a methodology for estimating the direction of a laser source, in accordance with certain of the embodiments disclosed herein.

FIG. 7 is a flowchart illustrating a methodology for estimating the direction of a laser source, in accordance with certain of the embodiments disclosed herein. As can be seen, example method 700 includes a number of phases and sub-processes, the sequence of which may vary from one embodiment to another. However, when considered in the aggregate, these phases and sub-processes form a process for detection and tracking in accordance with certain of the embodiments disclosed herein. These embodiments can be implemented, for example using the system architecture illustrated in FIG. 1 as described above. However other system architectures can be used in other embodiments, as will be apparent in light of this disclosure. To this end, the correlation of the various functions shown in FIG. 7 to the specific components illustrated in FIG. 1 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 700. Thus other embodiments may have fewer or more modules and/or sub-modules depending on the granularity of implementation. Numerous variations and alternative configurations will be apparent in light of this disclosure.

As illustrated in FIG. 7, in one embodiment, method 700 for estimating the laser source direction commences, at operation 710, by detecting the amplitude of a received laser signal at each of multiple sensors disposed on a detector array. The sensors are sized, for example in surface area, based on the speckle pattern of the laser signal to be detected, such that the sensors are small enough to be uniformly illuminated by the laser signal under speckle conditions.

Next at operation 720, ratios of the detected amplitudes between each of two sensors of one or more pairs of the sensors are calculated. At operation 730, a direction of the source of the laser signal is estimated based on the calculated ratios and on the orientation angles of the sensors as disposed on the detector array.

Of course, in some embodiments, additional operations may be performed, as previously described in connection with the system. These additional operations may include, for example, detecting the amplitude of the received laser signal at each of a second group of larger sensors disposed on a second detector array. The larger sensors of the second array are sized based on sensitivity requirements for detecting a laser signal that has been subjected to scattering effects, such as diffuse port scattering or aerosol scattering. These scattering effects diminish the received laser illumination, requiring greater sensor sensitivity, but also reduce laser speckle effects.

In some embodiments, a spatial gain profile is applied to the detected amplitudes to correct for calibrated sensitivity differences between the sensors. Additionally, in some embodiments, an alarm signal is generated in response to a detection of the laser signal exceeding a threshold amplitude value.

Example System

Figure 8:
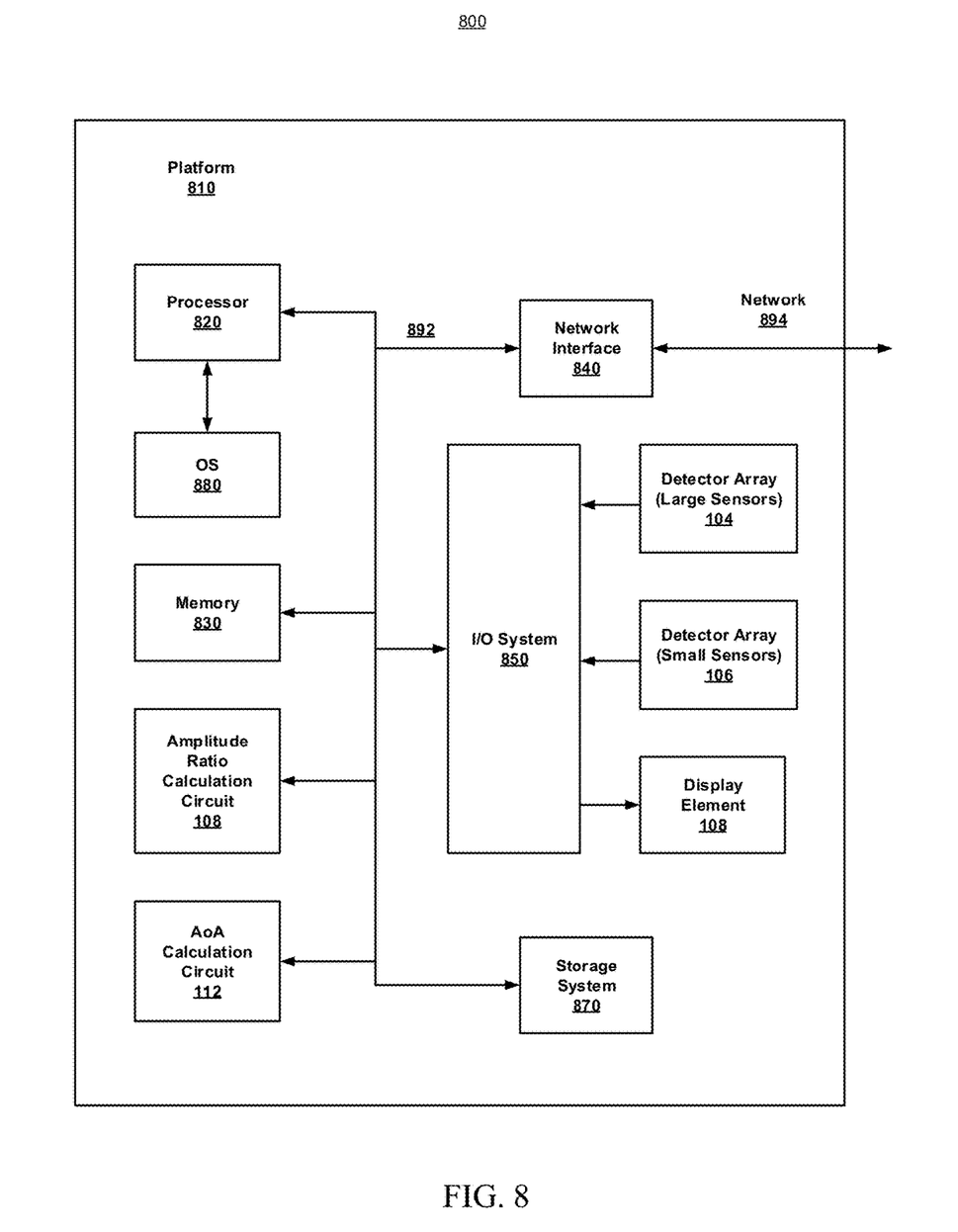
FIG. 8 is a block diagram schematically illustrating a system platform configured to estimate the direction of a laser source, configured in accordance with certain of the embodiments disclosed herein.

FIG. 8 illustrates an example system 800 configured to estimate the direction of a laser source, as described herein. In some embodiments, system 800 comprises a platform 810 which may host, or otherwise be incorporated into, a workstation, laptop computer, portable computer, handheld computer, tablet, ruggedized computing device, or any other suitable computing system. Any combination of different devices may be used in certain embodiments.

In some embodiments, platform 810 may comprise any combination of a processor 820, a memory 830, a network interface 840, an input/output (I/O) system 850, sensor arrays 104, 106, display element 108, and a storage system 870, along with amplitude ratio calculation circuit 108, and angle of arrival calculation circuit 112, as described herein. As can be further seen, a bus and/or interconnect 892 is also provided to allow for communication between the various components listed above and/or other components not shown. Platform 810 can be coupled to a network 894 through network interface 840 to allow for communications with other computing devices, platforms or resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor or a graphics processing unit, to assist in control and processing operations associated with system 800. In some embodiments, the processor 820 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as, for example, Google Android (Google Inc., Mountain View, Calif.), Microsoft Windows (Microsoft Corp., Redmond, Wash.), Linux, Apple OS X (Apple Inc., Cupertino, Calif.) and/or various real-time operating systems. As will be appreciated in light of this disclosure, the techniques provided herein can be implemented without regard to the particular operating system provided in conjunction with system 800, and therefore may also be implemented using any suitable existing or subsequently-developed platform.

Network interface circuit 840 can be any appropriate network chip or chipset which allows for wired and/or wireless connection between other components of computer system 800 and/or network 894, thereby enabling system 800 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of computer system 800. I/O devices may include, but not be limited to, sensors arrays 104, 106, display element 108, and other devices not shown such as a keyboard, mouse, microphone, speaker, etc.

I/O system 850 may include a graphics subsystem configured to perform processing of images for display elements 108. Graphics subsystem may be a graphics processing unit or a visual processing unit (VPU), for example. An analog or digital interface may be used to communicatively couple graphics subsystem and display element 108. For example, the interface may be any of a high definition multimedia interface (HDMI), DisplayPort, wireless HDMI, and/or any other suitable interface using wireless high definition compliant techniques. In some embodiment, the graphics subsystem could be integrated into processor 820 or any chipset of platform 810. In some embodiments, display element 108 may comprise any television type monitor or display. Display element 108 may comprise, for example, a computer display screen, touchscreen display, video monitor, television-like device, and/or a television. Display element 108 may be digital and/or analog. Under the control of the OS 880 (or one or more software applications), platform 810 may display sensor data and/or laser detection and estimation results on display element 108.

It will be appreciated that in some embodiments, the various components of the system 800 may be combined or integrated in a system-on-a-chip (SoC) architecture. In some embodiments, the components may be hardware components, firmware components, software components or any suitable combination of hardware, firmware or software.

Amplitude ratio calculation circuit 108 and angle of arrival calculation circuit 112 are configured to estimate the direction of a laser source, based on data provided by sensor arrays 104, 106, in accordance with embodiments of the present disclosure. Circuits 108 and 112 can be implemented or otherwise used in conjunction with a variety of suitable software and/or hardware that is coupled to or that otherwise forms a part of system 800. Circuits 108 and 112 can additionally or alternatively be implemented or otherwise used in conjunction with user I/O devices that are capable of providing information to, and receiving information and commands from, a user. These I/O devices may include display element 108, a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments amplitude ratio calculation circuit 108, and angle of arrival calculation circuit 112 may be installed local to system 800, as shown in the example embodiment of FIG. 8. Alternatively, system 800 can be implemented in a client-server arrangement wherein at least some functionality associated with these circuits is provided to system 800 using an applet, such as a JavaScript applet, or other downloadable module. Such a remotely accessible module or sub-module can be provisioned in real-time in response to a request from a client computing system for access to a given server having resources that are of interest to the user of the client computing system. In such embodiments the server can be local to network 894 or remotely coupled to network 894 by one or more other networks and/or communication channels. In some cases access to resources on a given network or computing system may require credentials such as usernames, passwords, and/or compliance with any other suitable security mechanism.

In various embodiments, system 800 may be implemented as a wireless system, a wired system, or a combination of both. When implemented as a wireless system, system 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the laser source direction estimation methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a sensor array for estimating the direction of a laser source. The sensor array includes multiple sensors which are configured to detect the amplitude of a received laser signal. Each sensor is disposed on the array at a unique orientation angle relative to the other sensors, and the size of the sensors is selected based on the speckle pattern of the laser signal such that the sensors are uniformly illuminated by the laser signal. In some cases, the sensors belong to a first group of smaller sensors and the sensor array includes a second group of larger sensors. The larger sensors are also configured to detect the amplitude of the received laser signal, wherein each larger sensor is disposed on the array at a unique orientation angle relative to the other larger sensors. The size of the larger sensors is selected based on sensitivity requirements for detecting the laser signal subjected to scattering effects. In some such cases, the scattering effects are associated with diffuse port scattering and/or aerosol scattering. In some such cases, the sensor size (of the smaller sensors) refers to a largest dimension of active sensor area of an individual small sensor and that dimension is less than or equal to 0.05 inches, and the larger sensor size refers to a largest dimension of active sensor area of an individual larger sensor and that dimension is greater than or equal to 0.5 inches. In some such cases, the smaller sensors and the larger sensors are PIN diodes. In some such cases, the sensor array includes five of the smaller sensors and five of the larger sensors.

Another example embodiment of the present disclosure provides a system for estimating the direction of a laser source. The system includes a detector array comprising multiple sensors, the sensors configured to detect the amplitude of a received laser signal, wherein each sensor is disposed on the array at a unique orientation angle relative to the other sensors. The size of the sensors is selected based on a speckle pattern of the laser signal such that the sensors are uniformly illuminated by the laser signal. The system also includes an amplitude ratio calculation circuit configured to calculate ratios of the detected amplitudes between each of two sensors of one or more pairs of the sensors. The system further includes an angle of arrival calculation circuit to estimate a direction of the source of the laser signal based on the calculated ratios and on the orientation angles of the sensors. In some cases, the detector array is a first detector array having multiple small sensors and the system further includes a second detector array comprising multiple larger sensors also configured to detect the amplitude of the received laser signal, wherein each larger sensor is disposed on the second array at a unique orientation angle relative to the other larger sensors. The size of the larger sensors is selected based on sensitivity requirements for detecting the laser signal subjected to scattering effects. In some such cases, the scattering effects are associated with diffuse port scattering and/or aerosol scattering. In some such cases, the sensor size (of the smaller sensors) refers to a largest dimension of active sensor area of an individual small sensor and that dimension is less than or equal to 0.05 inches, and the larger sensor size refers to a largest dimension of active sensor area of an individual larger sensor and that dimension is greater than or equal to 0.5 inches. In some such cases, the smaller sensors and the larger sensors are PIN diodes. In some such cases, the sensor array includes five of the smaller sensors and five of the larger sensors. In some cases, the system further includes a spatial gain profiling circuit configured to apply a spatial gain profile to the detected amplitudes to correct for calibrated sensitivity differences between the sensors. In some cases, the amplitude ratio calculation circuit is further configured to generate an alarm signal in response to a detection of the laser signal exceeding a threshold amplitude value.

Yet another example embodiment of the present disclosure provides computer readable storage medium having instructions encoded thereon that, when executed by one or more processors, result in operations for estimating the direction of a laser source. The operations include detecting an amplitude of a received laser signal at each of multiple sensors disposed on a detector array, wherein the sensors are sized based on a speckle pattern of the laser signal such that the sensors are uniformly illuminated by the laser signal. The operations further include calculating ratios of the detected amplitudes between each of two sensors of one or more pairs of the sensors and estimating a direction of the source of the laser signal based on the calculated ratios and on orientation angles of the sensors. In some cases, the detector array is a first detector array having multiple small sensors and the operations further include detecting the amplitude of the received laser signal at each of a second group of multiple larger sensors disposed on a second detector array. The size of the larger sensors is selected based on sensitivity requirements for detecting the laser signal subjected to scattering effects. In some such cases, the scattering effects are associated with diffuse port scattering and/or aerosol scattering. In some such cases, the sensor size (of the smaller sensors) refers to a largest dimension of active sensor area of an individual small sensor and that dimension is less than or equal to 0.05 inches, and the larger sensor size refers to a largest dimension of active sensor area of an individual larger sensor and that dimension is greater than or equal to 0.5 inches. In some cases, the operations further include applying a spatial gain profile to the detected amplitudes to correct for calibrated sensitivity differences between the sensors. In some cases, the operations further include generating an alarm signal in response to a detection of the laser signal exceeding a threshold amplitude value.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A sensor array for estimating direction of a laser source, the sensor array comprising:
   a plurality of sensors, the sensors to detect an amplitude of a received laser signal, wherein each of the plurality of sensors is disposed on the array at a unique orientation angle relative to the other sensors, wherein the plurality of sensors comprises a first plurality of small sensors and a second plurality of larger sensors, and a size of the small sensors is selected based on a speckle pattern of the laser signal such that the sensors are uniformly illuminated by the laser signal, a size of the larger sensors is selected based on sensitivity requirements for detecting the laser signal subjected to scattering effects, and wherein the size of the small sensors refers to a largest dimension of an active sensor area of an individual small sensor which is less than or equal to 0.05 inches, and the size of the larger sensor refers to a largest dimension of active sensor area of an individual larger sensor which is greater than or equal to 0.5 inches.

2. The sensor array of claim 1, wherein the scattering effects are associated with one of diffuse port scattering and aerosol scattering.

3. The sensor array of claim 1, wherein the small sensors and the larger sensors are PIN diodes.

4. The sensor array of claim 1, wherein the sensor array comprises five of the small sensors and five of the larger sensors.

5. A system for estimating direction of a laser source, the system comprising:
   a detector array comprising a plurality of sensors, the sensors to detect an amplitude of a received laser signal, wherein each sensor is disposed on the array at a unique orientation angle relative to the other sensors, and a size of at least one of the sensors is selected based on a speckle pattern of the laser signal such that the sensors are uniformly illuminated by the laser signal and a size of at least another of the sensors is selected based on sensitivity requirements for detecting the laser signal subjected to scattering effects;
   an amplitude ratio calculation circuit to calculate ratios of the detected amplitudes between each of two sensors of one or more pairs of the sensors; and
   an angle of arrival calculation circuit to estimate a direction of the source of the laser signal based on the calculated ratios and on the orientation angles of the sensors.

6. The system of claim 5, wherein the detector array is a first detector array having a plurality of small sensors, the system further comprising a second detector array comprising a plurality of larger sensors, wherein the small sensors and the larger sensors detect the amplitude of the received laser signal.

7. The system of claim 6, wherein the scattering effects are associated with one of diffuse port scattering and aerosol scattering.

8. The system of claim 6, wherein a size of the small sensors refers to a largest dimension of active sensor area of an individual small sensor and that dimension is less than or equal to 0.05 inches, and a size of the larger sensors refers to a largest dimension of active sensor area of an individual larger sensor and that dimension is greater than or equal to 0.5 inches.

9. The system of claim 6, wherein the small sensors and the larger sensors are PIN diodes.

10. The system of claim 6, wherein the detector array comprises five of the small sensors and the second detector array comprises five of the larger sensors.

11. The system of claim 5, further comprising a spatial gain profiling circuit to apply a spatial gain profile to the detected amplitudes to correct for calibrated sensitivity differences between the sensors.

12. The system of claim 5, wherein the amplitude ratio calculation circuit is further to generate an alarm signal in response to a detection of the laser signal exceeding a threshold amplitude value.

13. At least one non-transitory computer readable storage medium having instructions encoded thereon that, when executed by one or more processors, result in the following operations for estimating direction of a laser source, the operations comprising:

detecting an amplitude of a received laser signal at each of a plurality of sensors disposed on a detector array, wherein at least one of the sensors are sized based on a speckle pattern of the laser signal such that the sensors are uniformly illuminated by the laser signal, and wherein at least one second sensor is sized based on sensitivity requirements for detecting the laser signal subjected to scattering effects;

calculating ratios of the detected amplitudes between each of two sensors of one or more pairs of the sensors; and estimating a direction of the source of the laser signal based on the calculated ratios and on orientation angles of the sensors.

14. The computer readable storage medium of claim 13, wherein the detector array is a first detector array having a plurality of small sensors and a second plurality of larger sensors disposed on a second detector array.

15. The computer readable storage medium of claim 13, wherein the scattering effects are associated with one of diffuse port scattering and aerosol scattering.

16. The computer readable storage medium of claim 14, wherein the small sensor size refers to a largest dimension of active sensor area of an individual small sensor and that dimension is less than or equal to 0.05 inches, and the larger sensor size refers to a largest dimension of active sensor area of an individual larger sensor and that dimension is greater than or equal to 0.5 inches.

17. The computer readable storage medium of claim 13, the operations further comprising applying a spatial gain profile to the detected amplitudes to correct for calibrated sensitivity differences between the sensors.

18. The computer readable storage medium of claim 13, the operations further comprising generating an alarm signal in response to a detection of the laser signal exceeding a threshold amplitude value.

* * * * *